No. 798,096. PATENTED AUG. 29, 1905.
S. S. EVELAND.
PROPELLER SHAFT THRUST BEARING.
APPLICATION FILED FEB. 26, 1903.
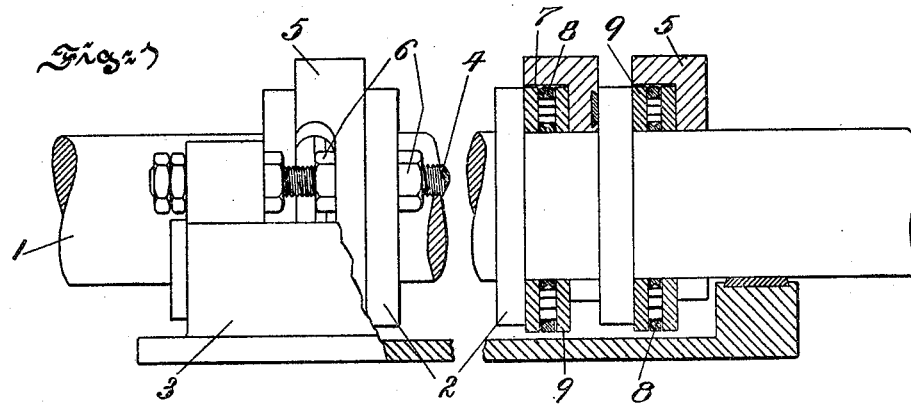
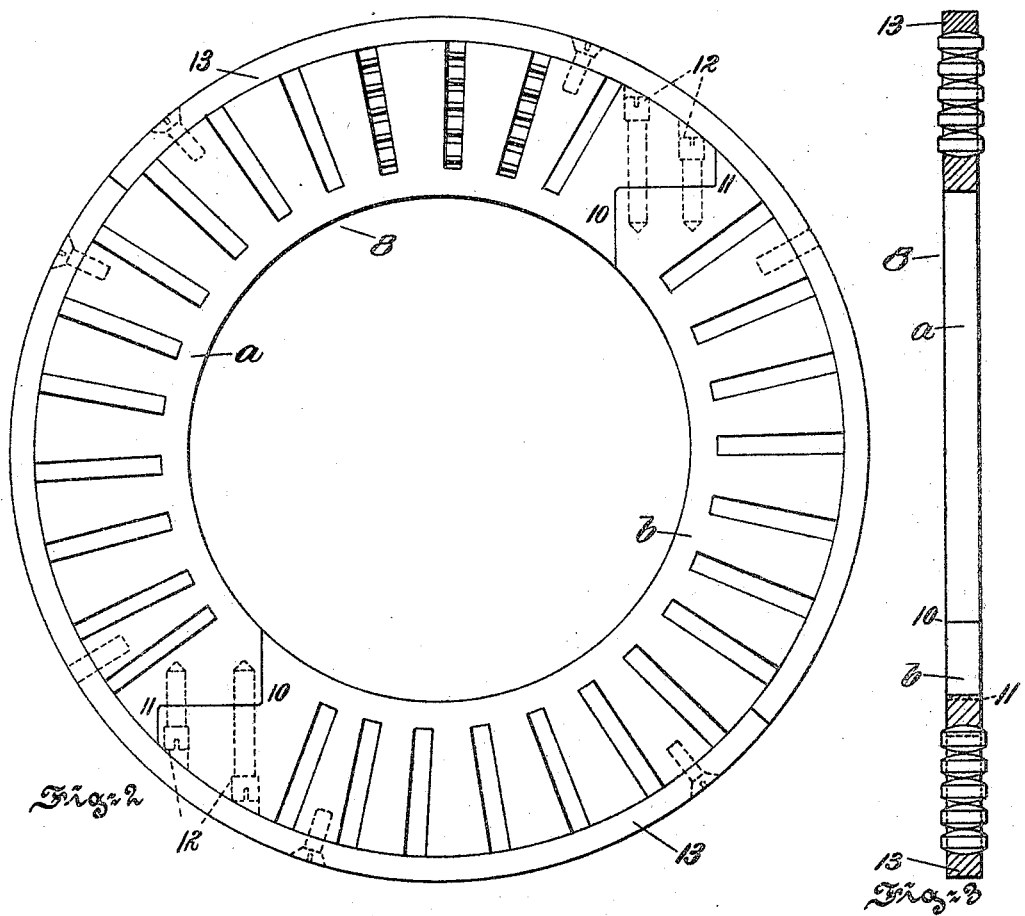
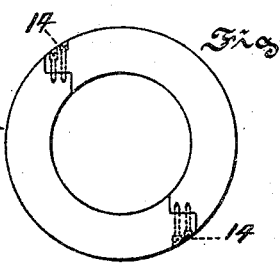
WITNESSES:
INVENTOR.
Samuel S. Eveland
BY Augustus B. Stoughton
ATTORNEY.

UNITED STATES PATENT OFFICE.

SAMUEL S. EVELAND, OF PHILADELPHIA, PENNSYLVANIA.

PROPELLER-SHAFT THRUST-BEARING.

No. 798,096.     Specification of Letters Patent.     Patented Aug. 29, 1905.

Application filed February 26, 1903. Serial No. 145,224.

*To all whom it may concern:*

Be it known that I, SAMUEL S. EVELAND, a citizen of the United States, residing at the city of Philadelphia, in the county of Philadelphia and State of Pennsylvania, have invented a new and useful Propeller-Shaft Thrust-Bearing, of which the following is a specification.

The object of the present invention is to provide for the convenient application of a roller-end thrust-bearing to existing propeller-shafts and their boxes without disturbing the same and without requiring anything more than ordinary skill to effect the application.

To this and other ends, hereinafter set forth, the invention comprises the improvements to be presently described and finally claimed.

The nature, characteristic features, and scope of my invention will be more fully understood from the following description, taken in connection with the accompanying drawings, forming part hereof, and in which—

Figure 1 is an elevational view, partly in section, illustrating a propeller-shaft thrust-bearing embodying features of the invention. Fig. 2 is a view drawn to an enlarged scale in order to illustrate one of the separable roller-cages shown in Fig. 1. Fig. 3 is a sectional view of the roller-cage shown in Fig. 2, and Fig. 4 is an elevational view of one of the separable washers shown in Fig. 1.

In the drawings, 1 is the shaft, having the fixed collars 2.

3 is a box which carries on each side a screw 4.

5 represents horseshoe-bearings connected with the screws 4 by means of nuts 6.

The described construction is that of an ordinary marine thrust-bearing. However, in accordance with my invention the horseshoe-bearings 5 may be provided at one of their faces with a race or way 7, which accommodates a roller-cage 8 and washers 9. For this purpose, as shown in the drawings, the face is recessed. Both the washers and the roller-cage are separable—that is to say, they are made up of sections, of which two are shown in the drawings. The purpose of this is to enable them to be applied to the shaft 1. Referring to Fig. 2, the end of the sections *a* and *b* are finished so as to provide interlocking teeth which meet on a line 10 11, and there are bolts or screws 12, which serve to detachably connect the two sections. The parts 13 serve to keep the rollers in their proper grooves, and they may be removed from the exterior of the cage in order to get it apart. The washer 9 is made like the cage and its parts are connected detachably by means of screws 14. The inner edge of the washers and cage may be lined or coated with a babbitt or other soft-metal lining which when present serves to prevent cutting or undue abrasion of the shaft.

It will be obvious to those skilled in the art to which my invention appertains that modifications may be made in detail without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. A propeller-shaft thrust-bearing comprising the combination of the shaft and its fixed collar, a two-part separable roller-cage and its rollers, two-part separable washers arranged one on each side of the cage, and a horseshoe-bearing provided upon one of its faces with a countersunk portion within which is contained the cage and washers, substantially as described.

2. In a propeller-shaft thrust-bearing the combination of a two-part separable roller-cage and its rollers, two-part separable washers arranged one on each side of the cage, and a horseshoe-bearing provided upon one of its faces with a countersunk portion within which is contained the cage and washers, substantially as described.

In testimony whereof I have hereunto signed my name.

SAMUEL S. EVELAND.

Witnesses:
  W. J. JACKSON,
  K. M. GILLIGAN.